United States Patent [19]

Lewis

[11] Patent Number: 5,593,115
[45] Date of Patent: Jan. 14, 1997

[54] PIPE HANGER

[76] Inventor: James M. Lewis, 1349 Brenda Rd., Severn, Md. 21144

[21] Appl. No.: 260,424

[22] Filed: Jun. 15, 1994

[51] Int. Cl.⁶ .................................................. F16M 13/00
[52] U.S. Cl. ..................... 248/68.1; 248/200.1; 248/906; 52/220.1
[58] Field of Search ................................ 248/68.1, 74.2, 248/49, 71, 906, 57, 200.1; 174/48; 52/317, 220.1, 220.8, 654.1, 650.1, 690; 24/458

[56] References Cited

U.S. PATENT DOCUMENTS

| | | |
|---|---|---|
| D. 293,203 | 12/1987 | Hertensteiner . |
| 325,767 | 9/1985 | Prior . |
| 603,180 | 4/1898 | Dwyer . |
| 796,178 | 8/1905 | Beaton . |
| 833,613 | 10/1906 | Maiser . |
| 1,102,001 | 6/1914 | Cobourn ............................ 248/200.1 X |
| 2,661,483 | 12/1953 | Tortorice . |
| 2,670,919 | 3/1954 | Esoldi ..................................... 248/57 X |
| 3,162,413 | 12/1964 | Hexdall ................................ 248/343 X |
| 3,216,025 | 11/1965 | Roll . |
| 3,366,356 | 1/1968 | Fisher ........................................... 248/56 |
| 3,474,994 | 10/1969 | Swanquist .............................. 248/72 X |
| 3,606,217 | 9/1971 | Leiferman . |
| 3,718,307 | 2/1973 | Albanese .................................. 248/57 |
| 3,920,208 | 11/1975 | Dowdy et al. ......................... 248/72 X |
| 4,007,570 | 2/1977 | Hunter ..................................... 52/317 |
| 4,050,205 | 9/1977 | Ligda ................................. 52/220.1 X |
| 4,703,593 | 11/1987 | Smolik ................................ 248/906 X |
| 4,717,099 | 1/1988 | Hubbard ..................................... 248/57 |
| 4,909,461 | 3/1990 | Collins . |
| 5,050,824 | 9/1991 | Hubbard . |
| 5,060,892 | 10/1991 | Dougherty . |
| 5,149,026 | 9/1992 | Allen ..................................... 248/68.1 |
| 5,159,791 | 11/1992 | Juhas ................................. 52/223.6 X |
| 5,263,535 | 11/1993 | Philo et al. ............................ 248/73 X |
| 5,354,020 | 10/1994 | Richards ................................ 248/68.1 |

*Primary Examiner*—Karen J. Chotkowski

[57] ABSTRACT

A telescopically extendable elongate pipe hangar has resilient connector grommets affixed to opposed ends. The grommets snap rigidly into standard punch holes or knockouts to secure the pipe hangar to metal construction studs. The hangar has spaced boreholes along at least one side for receiving screws or bolts attaching clamps at selective locations to space and support pipes.

9 Claims, 3 Drawing Sheets

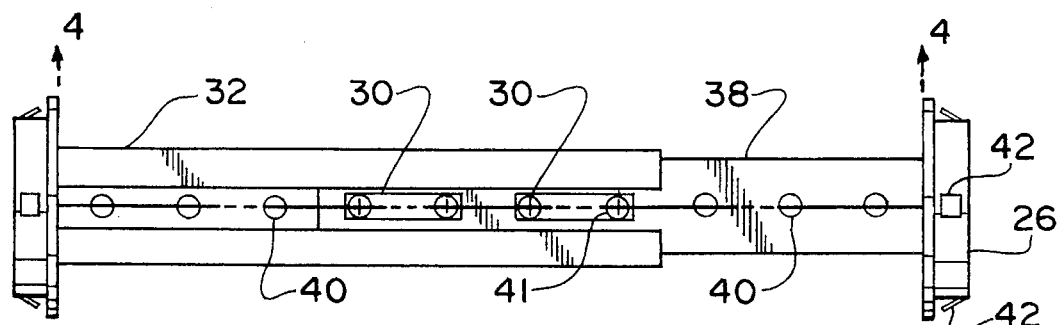
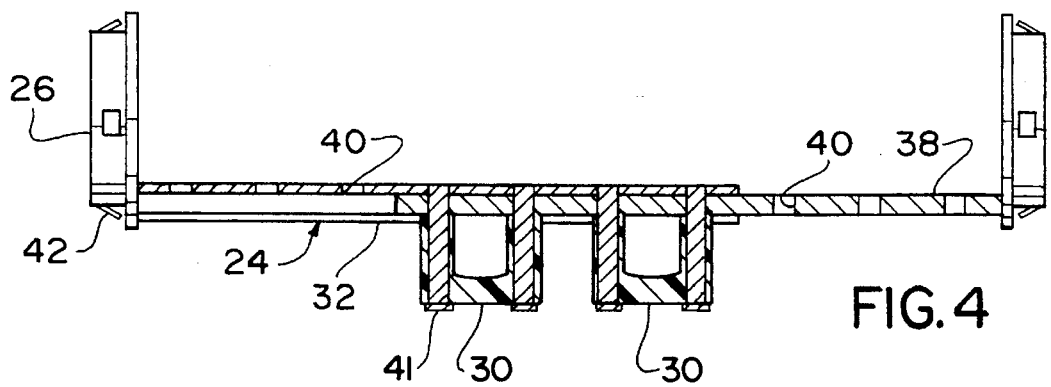
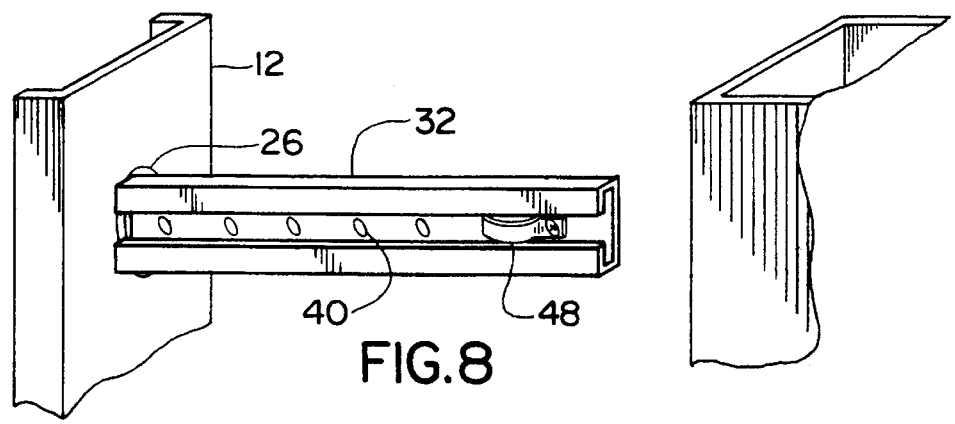
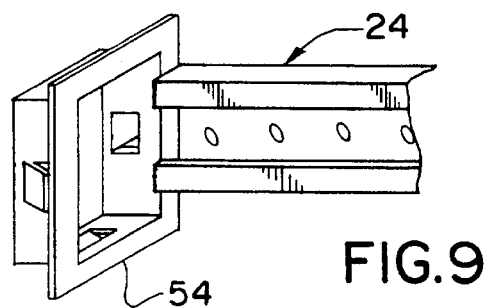

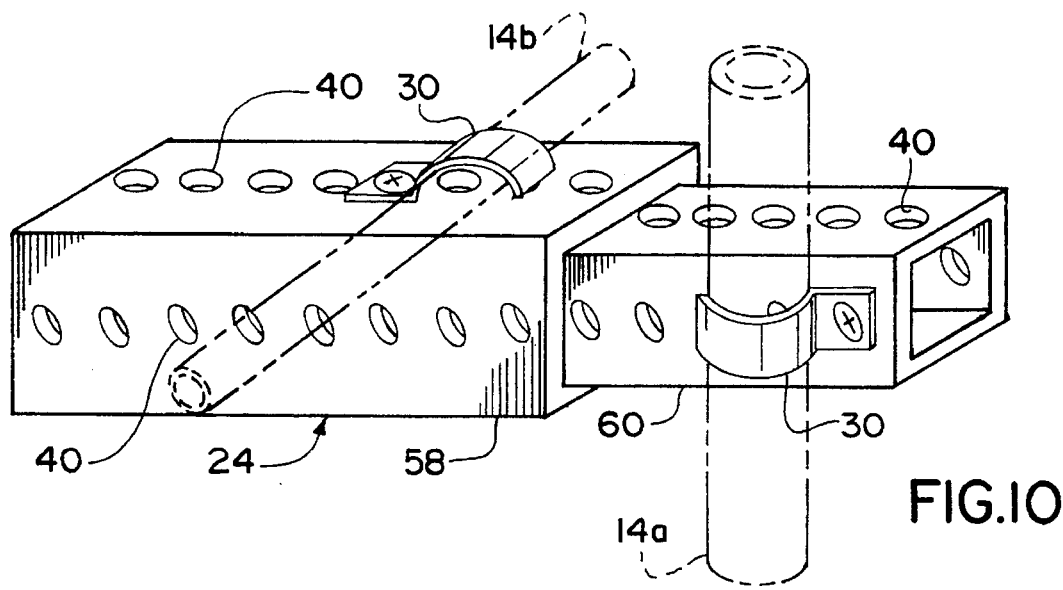
FIG.10
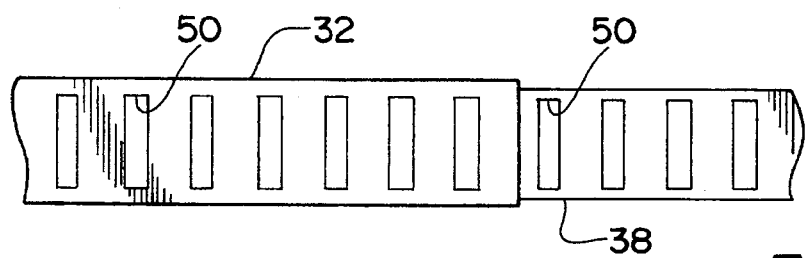
FIG 5
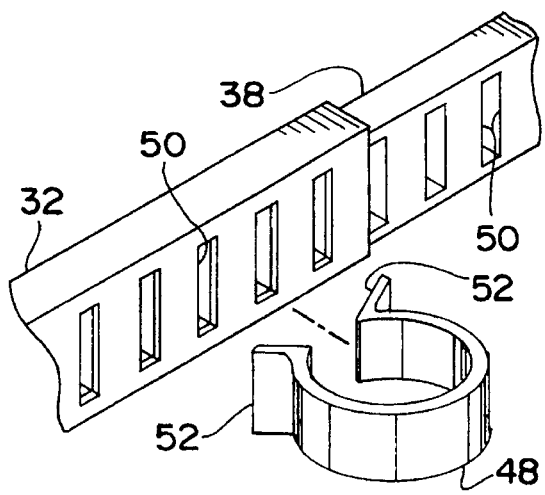
FIG.6
FIG.7
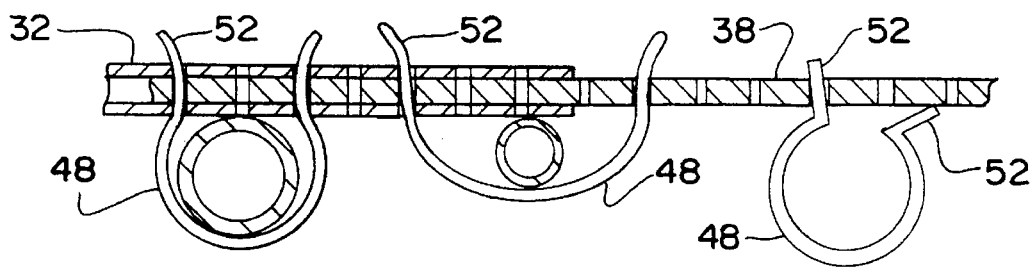

PIPE HANGER

BACKGROUND OF THE INVENTION

1. Field of the Invention

The present invention relates to building construction and more particularly to the field of plumbing.

2. Description of the Prior Art

Plumbing lines are run between vertical studs within the walls of houses and buildings. Building codes and good construction practice requires that these lines be provided with structural support to maintain spacing and to protect against joint weakening from vibration caused by valve operation and waterhammer effects. Traditionally, this support has been provided by two by fours nailed between studs and drilled or notched to allow pipe passage or by straps or by clamps attached to telescoping brackets secured between spaced adjacent studs. In some situations, where pipes, conduits, vents or the like are run between the same pair of studs, plumbing line support must be provided by attachments made on a single side. Rigging solutions to these requirements using materials at hand is rarely difficult but it is frequently makeshift, weak and particularly time consuming.

Solutions to this class of problem have included strikeout bars nailed or riveted across the studs having vertically aligned notches into which plumbing lines are snap-fit, characterized in U.S. Pat. No. 4,909,461 (Collins). Another solution includes pipe-clamping brackets slidably mounted over steel strapping nailed between studs, characterized by U.S. Pat. No. 5,050,824 (Hubbard).

Two piece sliding or telescoping brackets screwed or nailed on each side into adjacent studs or joists and carrying slidably adjustable pipe supporting straps have been long known, exemplified by U.S. Pat. Nos. 796,178 (Benton) and 833,613 (Maiser).

None of the prior art pipe hanging devices, however, is compatible with the metal studs popular in modern commercial construction and, increasingly, residential building. Common practice has typically involved fabricating a support consisting of a copper coated foot fixture screwed to the metal stud, a section of scrap copper tube measured and cut to length and soldered into the foot and a two piece pipe clamp soldered on one side to the tube. The pipe or tubing to be supported is then placed against the soldered clamp side and fixed in place by bolting the second clamp side to the first around the pipe. This procedure is slow, tedious and expensive in both material and time.

OBJECTS AND SUMMARY OF THE INVENTION

Accordingly, it is a primary object of the present invention to provide a hanger for supporting pipes and tubing between studs and joists.

It is another object of the present invention to provide a pipe hanger that attaches quickly and securely between metal studs.

It is a further object of the present invention to provide a pipe hangar that also provides a pass-through for electrical cables and wire between metal studs.

It is yet another object of the present invention to provide adjustably positionable pipe clamps mounted on a telescoping bracket of adjustable width.

Still another object of the present invention is to provide a pipe hanger that is adapted to mount on a single stud or joist.

In accordance with the present invention, a flanged flat bar slides telescopically within an open sided flat channel to form an expandable bracket adjustably spanning adjacent studs or joists. Bore holes are spaced and sized along both the bar and channel to receive bolts or screws attaching removable pipe clamps to the bracket. On each end of the bracket, attached on one end to the channel and on the other end to the flat bar, are compression fit electrician grommets sized to snap securely into standard holes punched or formed into metal studs or joists.

Some of the advantages of the present invention over the prior art are that the pipe hanger of the present invention provides an inexpensive, adjustable and easily and quickly installed pipe support and hanger adapted to be used with metal stud construction. Expensive time-consuming on-site fabrication is avoided and costly copper and solder are not required. In addition, standardization and reliability are improved.

The above and still further objects, features and advantages of the present invention will become apparent upon considering the following detailed description of preferred embodiments thereof, particularly when viewed in connection with the accompanying drawings wherein like reference numerals in the various figures are utilized to designate like components.

BRIEF DESCRIPTION OF THE DRAWINGS

FIG. 3 is a front elevation view of the present invention.

FIG. 4 is a cross-sectional view of FIG. 3 through line 4—4 in FIG. 3.

FIG. 5 is a broken front elevation view of the present invention having slots for spring clips.

FIG. 6 is a broken exploded perspective view of the present invention using slots and a spring clip.

FIG. 7 is a broken top plan view of the present invention with spring clips spanning various widths.

FIG. 8 is a broken perspective view of the present invention used as a cantilevered single stud pipe support.

FIG. 9 is a broken perspective view of the present invention with rectangular snap connectors.

FIG. 10 is a broken perspective view of a four sided pipe support bracket according to the present invention.

DESCRIPTION OF THE PREFERRED EMBODIMENT

Figure 1:
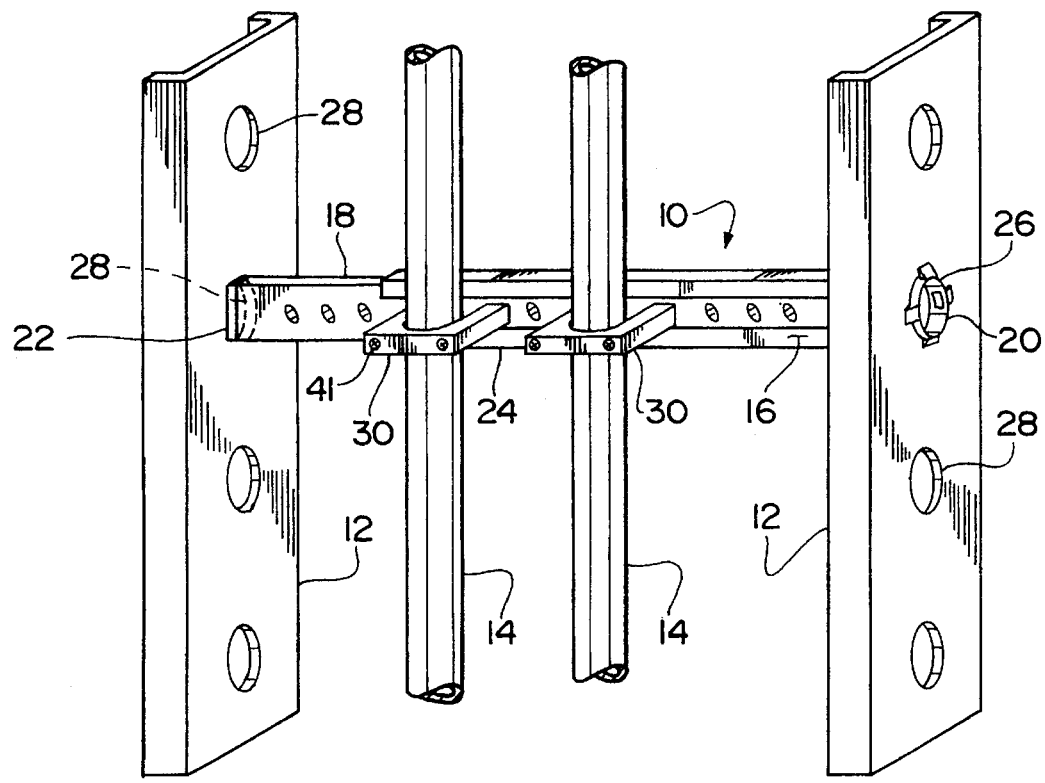
FIG. 1 is a perspective view of the pipe hanger of the present invention in a typical installation between metal studs.
Figure 2:
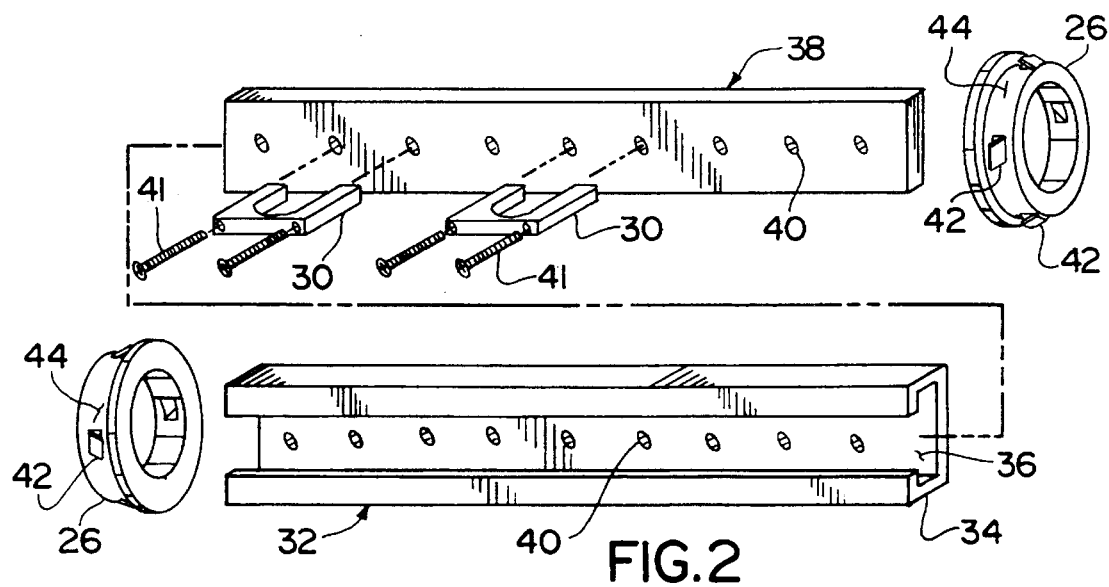
FIG. 2 is an exploded perspective view of the present invention.

One embodiment of the pipe hanger 10 of the present invention, as shown in FIGS. 1–4, is attached to and between metal studs 12 to support pipes 14 extending longitudinally between the studs.

Pipe hanger 10 will be described as having a front side 16 aligned to face toward pipes 14, a back side 18 aligned to face away from pipes 16 and right and left ends, 20 and 22, respectively, when viewed facing the front side 16 of the hanger. The hanger 10 comprises an elongate longitudinally extendable telescoping bracket 24 spanning adjacent studs or joists, snap connectors 26 affixed on right and left opposed ends, 20 and 22, respectively, configured to resiliently mate in snug fit with openings 28 in the studs or joists, and at least one pipe-gripping clamp 30 removable and adjustably attachable along the length of the front side 16 of bracket 24.

The telescoping bracket 24 includes an elongate first bracket member 32 having a rectangular longitudinal channel 34 with an open central slot 36 forming a keyway along the front side, and a generally flat elongate second bracket member 38 sized to be captured by but fit slidingly within channel 34 of box member 32. The term telescoping is used here to indicate a longitudinally sliding relationship between elongate members configured to fit one at least partially within the other. Threaded boreholes 40 are spaced along the front sides of first bracket member 32 and second bracket member 38 to receive screws or bolts 41 extending through pipe clamps 30 attaching clamps 30 to the bracket 24. Snap connectors 26 affixed to opposed ends of bracket 24 are short open cylindrical grommets, or collars having resilient shoulders 42 extending outward from the outer surface 44 of the cylinder. These shoulders deflect inwardly allowing the grommets to be inserted into standard holes 28 in thin gauge metal studs, then spring outward after passage through the metal to secure the grommet in place in snap-fit engagement on the stud. Alternatively resilient shoulders 42 will effectively grip against the sidewall of an appropriately sized borehold in a wooden stud allowing the pipe hanger of the present invention to be used with wooden studs as well as metal stud construction. Commercially available grommets, for example "pipe-tytes®", part no 750-P, manufactured by Pipe-Tytes, Inc. of Boone, N.C., sized to fit snugly into openings formed in metal studs by standard electrician's hole punches, are suitable to serve as the snap connectors 26 of the present invention. Such grommets are used to protect electrical cables from the sharp edges of metal stud punch holes and to prevent pipe vibration. Bracket 24 is affixed to snap connectors off center enabling the grommet to simultaneously serve as an electrical cable pass-through as well as a pipe hangar support.

Pipe clamps 30 selectively attachable along the length of telescoping bracket 24 can also be of conventional design, for instance Glide Clips Model No. 605 manufactured by Amtrol, Inc. of W. Warwick, R.I. Boreholes 40 are closely spaced along bracket 24 permitting attachment of clamps 30 all along the length of the bracket to accommodate a wide variation in pipe spacing. Boreholes 40 can be threaded to receive bolts 41 or alternatively sized to receive self-threading screws to mount clamps 30 to bracket 24.

Arcuate spring clips 48 can be used in conjunction with boreholes 40 or clip slots 50 as shown in FIGS. 5–7 to provide a quick alternative attachment of pipe to bracket. Outwardly extending end sections, or ears, 52 on the spring clips are pressed toward each other to permit insertion of the clip ears into the holes or slots after encircling the pipe to be supported. The clip ears resiliently and lockingly engage the holes or slots clamping the pipe to the bracket when the compressing force is removed. In addition to requiring no installation tools, the number of holes or slots spanned by the engaged clip ears can be varied to accommodate different pipe sizes with the same clip.

As circumstances require, second inner bracket member 38 can be removed from first outer bracket member 32 to provide two rigid, non-telescoping pipe support brackets each attachable at one end by a connector grommet 26 to a single metal stud and cantilevered outward therefrom as shown in FIG. 8 to carry one or more clamps 30. This permits one sided support to be provided to pipes located in positions inaccessible to the stronger cross-span support provided by a telescoping bracket attached to studs on both ends.

In an alternative embodiment, FIG. 9, rectangular grommets 54 sized to mate with preformed standard spaced openings or knockouts 56 formed in metal studs 12 at manufacture are affixed to the ends of bracket 24. In another embodiment, shown in FIG. 10, bracket 24 comprises a first outer bracket member 58, in the form of an open box beam, and a second inner bracket member 60 also in the form of a box beam sized to fit in sliding telescoping relation in first outer bracket member 58. Both bracket members 58 and 60 are provided with a plurality of threaded or unthreaded boreholes 40 closely spaced along each side of the box-shaped beams allowing clamps 30 to be attached along the bracket to secure piping 14a and 14b running parallel and perpendicular, respectively, to studs 12.

In use, standard electrician grommet holes 46 are punched into adjacent metal studs 12 between which a pipe run is required. Bracket 24 is inserted with front side 16 forward between holes 46 and telescopically expanded or extended to allow snap connectors or grommets 26 on the ends of bracket 24 to be snapped firmly into holes 46 forming a rigid brace between the studs. Pipes 14 are run between the studs in spaced alignment in front of bracket 24. Clamps 30 are fit over the pipes and attached at appropriate locations along the length of telescoping bracket 24 using bolts or screws 41 extending into spaced boreholes 40 in bracket 24, securing and supporting piping 14. Electrical cabling is passed through stud punch holes 46 and bracket end grommets 26 as required to eliminate the need for additional hole punching. No on-site fabrication is required and no solder or copper tubing is used.

Connector grommets 26 configured to fit any particular formed or punch hole stud opening can be integrally formed with first and second bracket members 32 and 38, respectively, of, for instance PVC material or the like, or the grommets can be configured as separate interchangeable components selectively attachable to bracket members 32 and 38. Pipe clamps 30 can be slidably attached to bracket 24 for ease of handling and assembly or can also be separate interchangeable components. Plastic is a preferred material for both connector grommets and clamps to avoid dielectric corrosion problems but other materials may be used. Telescoping bracket 24 is not constrained to a simple two piece outer and inner member configuration but can include more telescoping components where span width or storage compactness requires.

From the foregoing description it will be appreciated that the present invention makes available an inexpensive, easily and quickly installed pipe hanger particularly adapted for use between metal construction studs and uniquely compatible with electrical wiring runs.

Having described preferred embodiments of a new and improved pipe hanging apparatus constructed in accordance with the present invention, it is believed that other modifications, variations and changes will be suggested to persons skilled in the art in view of the teachings set forth herein. It is therefore to be understood that all such variations, modifications and changes fall within the scope of the present invention as defined by the appended claims.

What is claimed is:

1. A pipe hangar bracket for supporting pipe between spaced metal construction studs having openings of standard configuration formed or formable therein, said bracket comprising:

elongate first and second bracket members having opposed end portions and having top, bottom, front and back sides, said first and second bracket members being retained in telescoping relation to each other and having a plurality of spaced boreholes along said front sides for receiving attaching screws for selectively securing at lease one pipe clamp along at least one of said bracket members; and first and second resilient connecting grommets attached to said opposed end portions, said grommets configured to snap rigidly from the space between the studs into said openings defined in the opposed sides of the spaced metal studs, said bracket members being attached off-center with respect to said grommets to permit passage of electrical cable through said grommets.

2. The pipe hanger bracket of claim 1 wherein said connecting grommets are configured to snap fit into circular punch-holes formed in metal studs by standard electrician stud punches.

3. The pipe hanger bracket of claim 1 wherein said connecting grommets are configured to snap fit into standard knock-out openings in metal studs.

4. The pipe hanger bracket of claim 1 wherein said connecting grommets are configured to be selectively interchangeably attachable to said bracket members.

5. The pipe hanger bracket of claim 1 wherein said elongate bracket members are generally rectangular in cross-section.

6. The pipe hanger bracket of claim 5 further comprising a plurality of spaced boreholes along said top sides for receiving attaching screws for selectively securing at least one pipe clamp.

7. The pipe hanger bracket of claim 1 wherein said spaced boreholes are threaded for receiving attaching bolts.

8. The pipe hanger bracket of claim 1 further comprising pipe clamps slidably attached to said bracket members.

9. A pipe hanger bracket for supporting pipe between spaced metal construction studs having openings of standard configuration formed or formable therein, said bracket comprising:

elongate first and second bracket members having opposed end portions and having top, bottom, front and back sides, said first and second bracket members being retained in telescoping relation to each other and having a plurality of spaced boreholes along said front sides for receiving attaching screws for selectively securing at least one pipe clamp along at least one of said bracket members; and first and second resilient connecting grommets attached to said opposed end portions, said grommets configured to snap rigidly into openings defined in the spaced metal studs, said opposed end portions affixed off-center with respect to said grommets to permit passage of electrical cable through said grommets.

* * * * *